ND010476672B2

United States Patent
Robertson

(10) Patent No.: US 10,476,672 B2
(45) Date of Patent: Nov. 12, 2019

(54) FRAGMENTED ENCRYPTION OF A SECRET

(71) Applicant: CALLWARE TECHNOLOGIES, INC., Sandy, UT (US)

(72) Inventor: John M. Robertson, Pleasant Grove, UT (US)

(73) Assignee: CALLWARE TECHNOLOGIES, INC, Sandy, UT (US)

(*) Notice: Subject to any disclaimer, the term of this patent is extended or adjusted under 35 U.S.C. 154(b) by 273 days.

(21) Appl. No.: 15/458,873

(22) Filed: Mar. 14, 2017

(65) Prior Publication Data

US 2017/0264430 A1    Sep. 14, 2017

Related U.S. Application Data

(60) Provisional application No. 62/307,655, filed on Mar. 14, 2016.

(51) Int. Cl.
*H04L 29/06* (2006.01)
*H04L 9/08* (2006.01)

(52) U.S. Cl.
CPC .............. *H04L 9/085* (2013.01); *H04L 9/083* (2013.01); *H04L 9/0869* (2013.01); *H04L 2209/08* (2013.01)

(58) Field of Classification Search
CPC ....... H04L 9/085; H04L 9/0822; H04L 9/083; H04L 9/0869
See application file for complete search history.

(56) References Cited

U.S. PATENT DOCUMENTS

| | | | |
|---|---|---|---|
| 5,367,677 A * | 11/1994 | Stanfill | G06F 16/31 707/700 |
| 5,787,169 A | 7/1998 | Eldridge et al. | |
| 5,867,578 A | 2/1999 | Brickell et al. | |
| 5,937,066 A | 8/1999 | Gennaro et al. | |
| 6,178,508 B1 | 1/2001 | Kaufman | |
| 6,421,662 B1 * | 7/2002 | Karten | G06F 16/2237 |
| 6,587,946 B1 | 7/2003 | Jakobsson | |
| 6,731,755 B1 | 5/2004 | Cocks | |

(Continued)

OTHER PUBLICATIONS

Chaum, David, "How to Keep a Secret Alive: Extensible Partial Key, Key Safeguarding, and Threshold Systems", "Advances in Cryptology—CRYPTO '84, LNCS 196", 1985, Center for Mathematics and Computer Science (CWI), Amsterdam, The Netherlands.

*Primary Examiner* — Harunur Rashid
(74) *Attorney, Agent, or Firm* — Kunzler Bean & Adamson, PC

(57) ABSTRACT

Methods, apparatuses, systems, and program products are disclosed for secret fragmentation and distribution. A method includes generating a secret that may be divided into a plurality of segments such that the secret is re-constructed by combining each of the plurality of segments. A method includes assigning each of a plurality of users to one or more groups or groups of groups. A method includes mapping each of a plurality of segments of a secret to one or more of a plurality of users as a function of a number of users within each group. A method includes encoding each of a plurality of segments in a predefined format based on a mapping. A method includes distributing each of a plurality of encoded segments to each of one or more users that is mapped to each encoded segment.

18 Claims, 6 Drawing Sheets

(56) References Cited

U.S. PATENT DOCUMENTS

| | | | |
|---|---|---|---|
| 7,136,489 | B1 | 11/2006 | Madhusudhana et al. |
| 7,139,917 | B2 | 11/2006 | Jablon |
| 7,865,741 | B1 | 1/2011 | Wood et al. |
| 8,538,029 | B2 | 9/2013 | Li et al. |
| 9,143,491 | B2 | 9/2015 | Kruglick |
| 2002/0076052 | A1 | 6/2002 | Yung et al. |
| 2003/0026432 | A1 | 2/2003 | Woodward |
| 2003/0147535 | A1* | 8/2003 | Nadooshan ............ H04L 9/085 380/277 |
| 2004/0117649 | A1* | 6/2004 | Whyte .................... H04L 9/085 380/286 |
| 2004/0208316 | A1* | 10/2004 | Wack ...................... H04L 9/085 380/44 |
| 2006/0161791 | A1 | 7/2006 | Bennett |
| 2009/0116649 | A1 | 5/2009 | Perlman |
| 2011/0022883 | A1* | 1/2011 | Hansen .................. H04L 9/085 714/2 |
| 2012/0243687 | A1* | 9/2012 | Li ........................... H04L 9/085 380/277 |
| 2014/0201533 | A1* | 7/2014 | Kruglick .............. H04L 63/062 713/171 |

* cited by examiner

FRAGMENTED ENCRYPTION OF A SECRET

CROSS-REFERENCES TO RELATED APPLICATIONS

This application claims the benefit of U.S. Provisional Patent Application No. 62/307,655 entitled "QUORUM SIGNING" and filed on Mar. 14, 2016, for John M. Robertson, which is incorporated herein by reference.

FIELD

This invention relates to computer security and more particularly relates to segmenting a cryptographic key, securely distributing the segments among a plurality of users, and reconstructing the cryptographic key with the cooperation of a subset or a plurality of subsets of the plurality of users.

BACKGROUND

Digital signatures can be used to sign data and applications, such as software, so that the data and applications can be trusted. Some digital signatures are associated with a digital signing certificate issued by a certificate authority. To maintain the integrity of the digitally signed data, the private key associated with the signing certificate should be stored in a secure location that is isolated from a network. Other devices, such as USB flash drives, may also not be used for storing the private key due to various vulnerabilities. Because the private key is stored in an inconvenient location, it can become cumbersome to access and use the key to digitally sign data and applications.

SUMMARY

A method for cryptographic key generation and distribution is disclosed. An apparatus and computer program product also perform the steps of the method. In one embodiment, a method includes generating a cryptographic key. A cryptographic key may be divided into a plurality of key segments such that the cryptographic key is re-constructed by combining each of the plurality of key segments. A method, in a further embodiment, includes assigning each user of a plurality of users to one or more groups of users such that a total number of users assigned to each group is not larger than a number of bits in a cryptographic key. In various embodiments, a method includes mapping each of a plurality of key segments of a cryptographic key to one or more of a plurality of users as a function of a number of users within each group to generate a cryptographic quorum key for each user. In some embodiments, a method includes encoding each of a plurality of key segments in a predefined format based on a mapping. In certain embodiments, a method includes distributing each of a plurality of encoded key segments, or cryptographic quorum keys, to each of one or more users that is mapped to each of the encoded key segments.

An apparatus, in one embodiment, includes a key module that generates a cryptographic key. A cryptographic key may be divided into a plurality of key segments such that the cryptographic key is re-constructed by combining each of the plurality of key segments. An apparatus, in a further embodiment, includes a group module that assigns each user of a plurality of users to one or more groups of users such that a total number of users assigned to each group is not larger than a number of bits in a cryptographic key. In some embodiments, an apparatus includes a map module that maps each of a plurality of key segments of a cryptographic key to one or more of a plurality of users as a function of a number of users within each group to generate a cryptographic quorum key for each user. An apparatus, in certain embodiments, includes an encoding module that encodes each of a plurality of key segments in a predefined format based on a mapping. In various embodiments, an apparatus includes a distribution module that distributes each of a plurality of encoded key segments, or cryptographic quorum keys, to each of one or more users that is mapped to each of the encoded key segments.

A computer program product, in one embodiment, includes a computer readable storage medium having program code embodied therein. In one embodiment, program code is readable/executable by a processor for generating a cryptographic key. A cryptographic key may be divided into a plurality of key segments such that the cryptographic key is re-constructed by combining each of the plurality of key segments. In a further embodiment, program code is readable/executable by a processor for assigning each user of a plurality of users to one or more groups of users such that a total number of users assigned to each group is not larger than a number of bits in a cryptographic key. In some embodiments, program code is readable/executable by a processor for mapping each of a plurality of key segments of a cryptographic key to one or more of a plurality of users as a function of a number of users within each group to generate a cryptographic quorum key for each user. In certain embodiments, program code is readable/executable by a processor for encoding each of a plurality of key segments in a predefined format based on a mapping. In various embodiments, program code is readable/executable by a processor for distributing each of a plurality of encoded key segments, or cryptographic quorum keys, to each of one or more users that is mapped to each of the encoded key segments.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
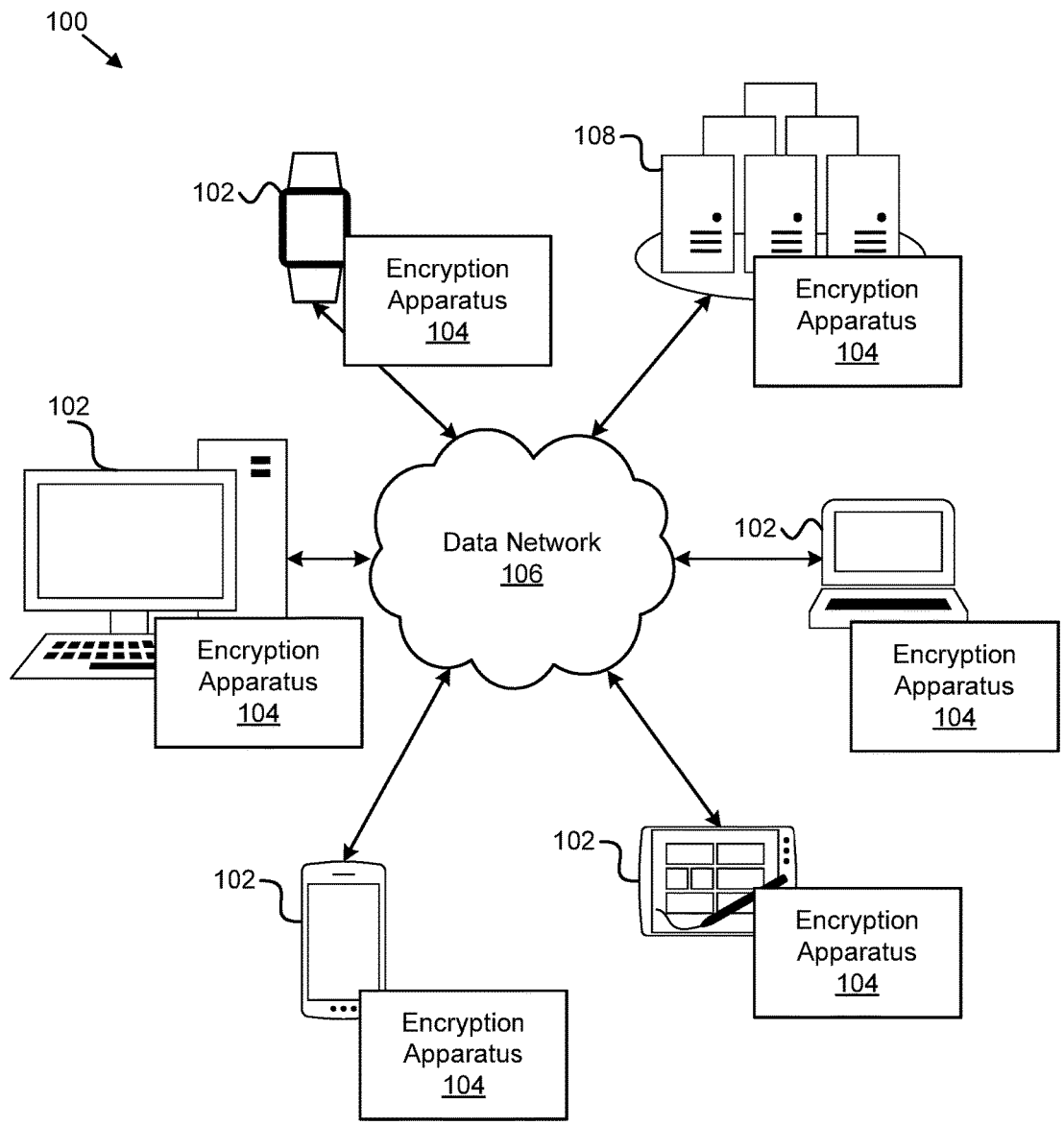
FIG. 1 is a schematic block diagram of one embodiment of a system for cryptographic key generation and distribution.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model. The computer program product may be stored on a shared file system accessible from one or more servers.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a system 100 for cryptographic key generation and distribution. In one embodiment, the system 100 includes one or more information handling devices 102, one or more encryption apparatuses 104, one or more data networks 106, and one or more servers 108. In certain embodiments, even though a specific number of information handling devices 102, encryption apparatuses 104, data networks 106, and servers 108 are depicted in FIG. 1, one of skill in the art will recognize, in light of this disclosure, that any number of information handling devices 102, encryption apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, are configured to execute various programs, program code, applications, instructions, functions, and/or the like, which may access, store, download, upload, and/or the like data located on one or more servers 108. The information handling devices 102 may be configured to generate encryption keys, encrypt and/or decrypt data, encode and/or decode data, and/or the like.

In one embodiment, the encryption apparatus 104 is configured to generate a cryptographic key and divide the cryptographic key into a plurality of different segments. The encryption apparatus 104, in a further embodiment, is configured to assign each of a plurality of users to one or more groups of users, where each group has a number of users that is not larger than a number of bits in the cryptographic key. The encryption apparatus 104, in some embodiments, maps each of the plurality of key segments to one or more of the plurality of users as a function of the number of users within each group. The encryption apparatus 104, in certain embodiments, encodes each of the plurality of key segments in a predefined format, and distributes each of the plurality of encoded key segments to each of the one or more users that is mapped to each encoded key segment. In this manner, in order to re-construct the cryptographic key, a certain number of users are required to provide their segments of the cryptographic key due to how the key segments are distributed to the various users, and the encoding of the key segments, as described in more detail below. The encryption apparatus 104, including its various sub-modules, may be located on one or more information handling devices 102 in the system 100, one or more servers 108, one or more network devices, one or more security systems, and/or the like. The encryption apparatus 104 is described in more detail below with reference to FIGS. 2 and 3.

In one embodiment, the encryption apparatus 104 improves computer and data security by uniquely encoding the segments of a cryptographic key, distributing the encoded key segments to a plurality of users, and re-constructing the cryptographic key by receiving the key segments from a subset of the users. In this manner, the cryptographic key may be used when a plurality of users combine their key segments, generally from their cryptographic quorum keys, in order to re-construct the cryptographic key.

In various embodiments, the encryption apparatus 104 may be embodied as a hardware appliance that can be installed or deployed on an information handling device 102, on a server 108, or elsewhere on the data network 106. In certain embodiments, the encryption apparatus 104 may include a hardware device such as a secure hardware dongle or other hardware appliance device (e.g., a set-top box, a network appliance, hardware security module ("HSM"), a security token, or the like) that attaches to a device such as a laptop computer, a server 108, a tablet computer, a smart phone, a security system, or the like, either by a wired connection (e.g., a universal serial bus ("USB") or local area network ("LAN") connection, or the like) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the encryption apparatus 104 may include a power interface, a wired and/or wireless network interface, a graphical interface that attaches to a display, and/or a semiconductor integrated circuit device as described below, configured to perform the functions described herein with regard to the encryption apparatus 104.

The encryption apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the encryption apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the encryption apparatus 104.

The semiconductor integrated circuit device or other hardware appliance of the encryption apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the encryption apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a Bluetooth® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as a mail server, a web server, an application server, an FTP server, a media server, a data server, a web server, a file server, a virtual server, and/or the like. The one or more servers 108 may be communicatively coupled (e.g., networked) over a data network 106 to one or more information handling devices 102. The one or more servers 108 may store data, programs, functions, libraries, and/or the like for generating cryptographic keys, encrypting and/or decrypting data, encoding and/or decoding data, and/or the like.

Figure 2:
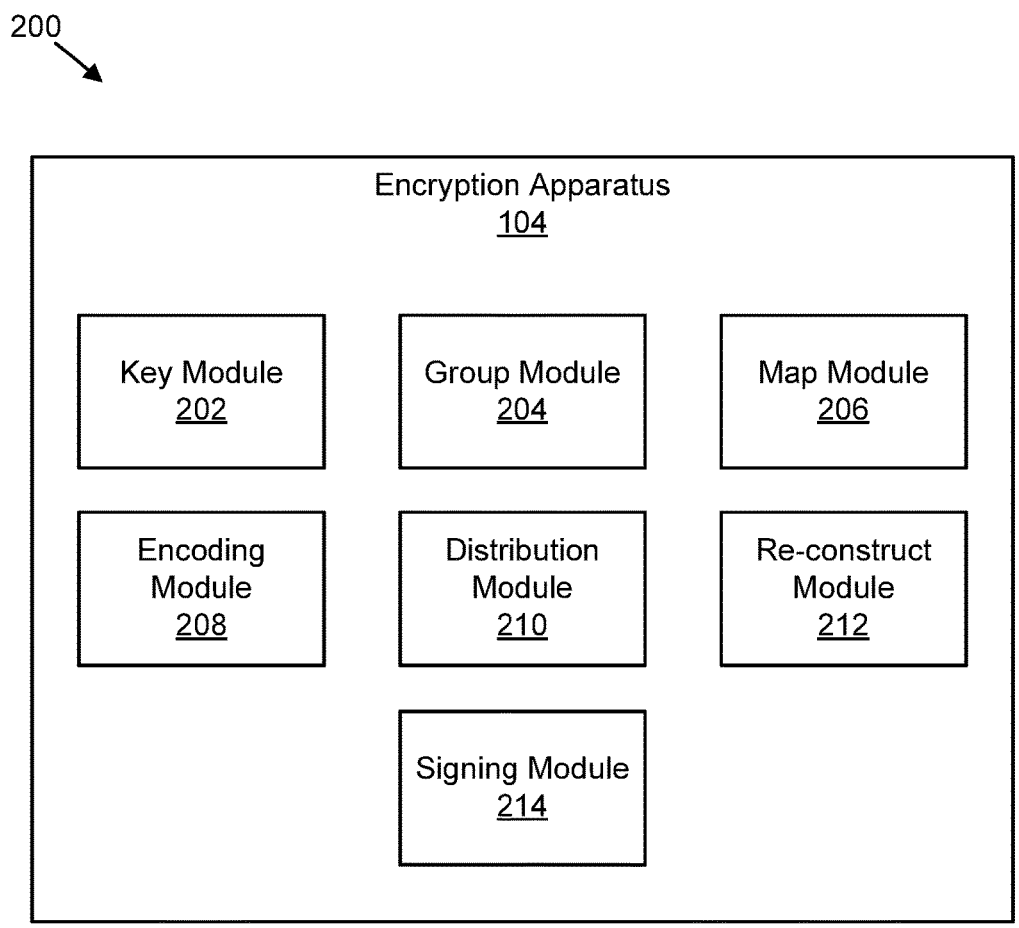
FIG. 2 is a schematic block diagram of an apparatus for cryptographic key generation and distribution.

FIG. 2 depicts one embodiment of an apparatus 200 for cryptographic key and cryptographic quorum key generation, encryption, distribution, decryption, reconstruction, and usage. In one embodiment, the apparatus 200 includes an instance of an encryption apparatus 104. The encryption apparatus 104, in some embodiments, includes one or more of a key module 202, a group module 204, a map module 206, an encoding module 208, a distribution module 210, a re-construct module 212, and a signing module 214, which are described in more detail below.

Generation and Distribution of Quorum Keys

The key module 202, in one embodiment, is configured to generate a cryptographic key. As used herein, a cryptographic key may comprise a string of bits that an encryption algorithm uses to encrypt data, decrypt data, digitally sign data, and/or the like. For example, the cryptographic key may be a private key of a public/private key pair. The key module 202, in one embodiment, generates cryptographic keys of various bit lengths, represented herein by sb. For instance, the key module 202 may generate a cryptographic key using a Rivest-Shamir-Adleman ("RSA") cryptosystem that comprises 2,048 bits, 4,096 bits, and/or the like. Similarly, the key could be based upon Elliptic Curve Cryptography ("ECC") or others.

In one embodiment, the key module 202 divides the cryptographic key into a plurality of key segments, each represented by Sn, which is described in more detail below.

The key module 202, for example, may divide the cryptographic key into multiple byte-sized segments, e.g. each segment may be eight bits long. However, the key module 202 may divide the cryptographic key into segments of various lengths, and each segment may have the same length or may have a different length.

In certain embodiments, the group module 204 determines a plurality of users who will be participants, members, or the like in the secure storage and distribution of the cryptographic key. The group module 204 may select users based on user input, e.g., based on input from a security officer, IT administrator, or the like. In certain embodiments, the group module 204 selects users automatically based on their job titles, job characteristics, positions within an organization, and/or the like. For example, the group module 204 may automatically select a board member, a chief technology officer, an IT administrator, senior IT officials, and/or any other internal or external user associated with an organization. The group module 204, in one embodiment, assigns a unique identifier to each of the users, which uniquely distinguishes one user from another user.

The group module 204, in one embodiment, assigns each of the plurality of users to one or more different groups, also known as cohorts. For reference, let K>0 represent the number of groups or cohorts. The group module 204, in some embodiments, randomly assigns group members to each group (e.g., by randomly selecting unique identifiers for the users), assigns group members based on a round-robin method, assigns weights to each user and then assigns each user to a group based on the assigned weights, and/or the like. In certain embodiments, the group module 204 ensures that each participant is assigned to at least one group. After the assignments are made, the group module 204 determines the number of unique users that have been assigned to one or more groups, N, the total number of groups, K, and the number of unique users associated with each group, Ni, where $i \in \mathbb{N} : K \geq i > 0$. Let Ci be used to designate each group according to the values of $i \in \mathbb{N} : K \geq i > 0$.

Regardless of how the users are assigned to each group, the group module 204 ensures that the combined total number of times a user is included in a group, for all users, is not larger than the number of bits in the cryptographic key. For example, if the cryptographic key is 128 bits long, then the total number of users that can be assigned to the groups, including duplicate users (e.g., the same user that is assigned to multiple groups) cannot be greater than 128 users. In other words, the number of times a user can be assigned to one or more groups cannot exceed the number of bits of the cryptographic key.

In one embodiment, the group module 204 determines a minimum number of users within each group, Ci, that are necessary to re-construct the cryptographic key, which is represented as Qi. For example, if a group has Ni equal to 25 users, and the group module 204 determines that ten of the users are required to form a "quorum" for the group Ci, then Qi would equal ten for this group. The group module 204, in one embodiment, randomly selects a quorum number for each group. In one embodiment, the quorum number is greater than zero, but cannot exceed the total number of users within a group. The quorum number, Qi, may be represented as $Ni \geq Qi > 0$ where i constitutes the natural numbers between zero and the total number of groups, e.g., $i \in \mathbb{N} : K \geq i > 0$. If, during re-construction of the cryptographic key, the quorum number for one or more groups is insufficient, then the key is unable to be re-constructed until the requisite number of users are present to form a quorum, Qi.

In certain embodiments, the group module 204 designates one or more users as being required for the re-construction of the cryptographic key, in addition to the following of the minimum quorum participation characteristics of the other groups.

Figure 3:
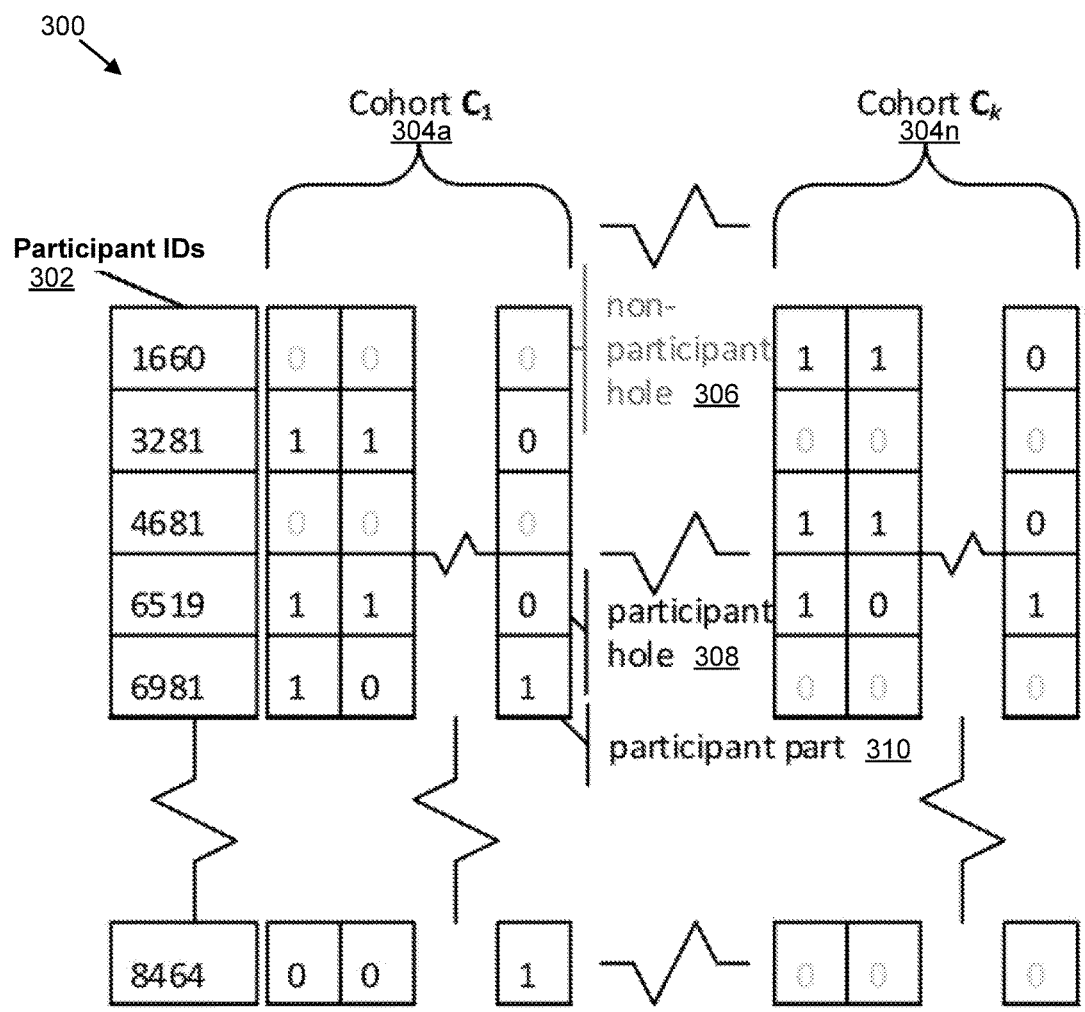
FIG. 3 is a schematic block diagram illustrating one embodiment of a "part-and-hole" bitmap that is used for cryptographic quorum key generation and distribution.

In one embodiment, the map module 206 maps each of the plurality of segments of the cryptographic key to corresponding users across each group, and distributes these segments in a cryptographic quorum key, described below. The map module 206, in one embodiment, generates a "part-and-hole" map, which may be embodied as a bitmap, as depicted in FIG. 3, to determine which segments of the cryptographic key are assigned to which users. While the "part-and-hole" map is depicted and described as a bitmap, various values may be used to indicate which segments of the cryptographic key are assigned to which users, such as other numbers, characters, and/or other identifiers. In one embodiment, the map module 206 determines each user that is in a group, and creates a column of user identifiers for each user that is sorted in ascending order. The map module 206 may further remove any duplicate identifiers, which may be present where a user is a member of multiple groups.

The map module 206, in certain embodiments, counts how many users are in each group or cohort, Ni where Ni≥Qi>0, and determines how many users from each group are required to share a segment of the cryptographic key, represented as Cspi. The Cspi for a group may be calculated by adding one to the number of users in a group, Ni, minus the minimum number of users within the group that are required to for a valid reconstruction of the cryptographic key, Qi. In other words, $\forall$ Ci, Cspi=Ni−Qi+1 where K $\in \mathbb{N}$ : K≥1 and represents the number of groups or cohorts, and i varies from 1 to K or i$\in \mathbb{N}$ N: K≥i>0.

For each group, Ci, the map module 206 completes each group's portion of the "part-and-hole" bitmap by iterating between the natural numbers (N) of zero and two raised to the power of Ni, or $2^{Ni}$. The map module 206 adds a column to the "part-and-hole" bitmap for every number between zero and $2^{Ni}$, which when converted to its binary equivalent, has the number of one-bits that is equal to the number of users for the group that are required to share a segment of the cryptographic key, or the group's Cspi. As each column is added to the "part-and-hole" bitmap, each binary bit value (zero or one) of the natural number that triggered the creation of the column is distributed, in order, to the rows in the column that are associated with the users that are members of the group, in row order. If a user is not a member of the group, they are skipped over and receive a zero bit value in their corresponding row of the column.

For instance, looking at FIG. 3, the first column after the column of user IDs 302 is the first column of the "part-and-hole" bitmap 300 for Cohort $C_1$ 304a. The users with IDs 3281, 6519, 6981, and 8464 have each been assigned a one-bit or a zero-bit based upon the binary representation of the natural numbers between zero and $2^{Ni}$ that had the Cspi number of one-value-bits. The users 1660 and 4681 were set to a zero-bit value, visually muted in FIG. 3, because they were not associated with the Cohort $C_1$ 304a.

Similarly, the next column of Cohort $C_1$ 304a sets the same set of users with the corresponding one-bit and zero-bit values from the next natural number between zero and $2^{Ni}$ that had the Cspi number of one-value-bits, while similarly skipping over the users that are not designated members of the Cohort $C_1$ 304a, which then have a zero-bit value set. This continues until all columns for the Cohort $C_1$ 304a have been added, then columns are similarly added for the next Cohort, and so on until all of the columns for all of the Cohorts $C_k$ have been added. Note how some users in FIG. 3 are only members of Cohort $C_1$ 304a—the users with IDs 3281, 6519, 6981, and 8464—some are only members of Cohort $C_k$ 304n—the users with IDs 1660 and 4681—and some are a members of both—the user with ID 6519.

Referring to FIG. 2, to reiterate, the map module 206 iterates over the natural numbers ($\mathbb{N}$) zero to $2^{Ni}$ for each cohort or group and adds a column to the map for each number that has the specific number of one-bits in its binary form equal to Cspi, and then distributes the binary one-bits and zero-bits, in order to each participant of the group or cohort, skipping over non-members until all groups have been addressed. This completes the "part-and-hole" bitmap. The "part-and-hole" bitmap, in one embodiment, ensures that the reconstruction of the cryptographic key cannot be accomplished with an insufficient number of users, from any single group. In other words, when the minimum number of users from every group is able to present their portion of the cryptographic quorum key can the entire cryptographic key be re-constructed.

In one embodiment, the map module 206 randomly swaps one or more columns of the "part-and-hole" bitmap, which may obfuscate the creation of the "part-and-hole" segment map (see below) from hackers, or other parties attempting to reverse engineer creation of the cryptographic key. In certain embodiments, after the map module 206 generates the "part-and-hole" bitmap, the map module 206 and/or the key module 202 determines the number of columns, p, in the "part-and-hole" bitmap. The key module 202, in one embodiment, segments the cryptographic key into p number of segments, which is not greater than the number of bits in the cryptographic key, sb. If the cryptographic key is not equally divisible by p, the key module 202 determines and stores the remainder, SR, for later use. Otherwise, SR will be null or empty when the cryptographic key is evenly divisible by p. As described below in more detail, the cryptographic key may be re-constructed by concatenating each segment, Sn, where n ranges from 1 to p in whole numbers, together with the remainder, SR, e.g., the cryptographic key=[$\frown_{n=1}^{P}$Sn]$\frown$SR.

The encoding module 208, in one embodiment, is configured to encode each of the plurality of key segments in a predefined format based on the mapping of key segments to users, e.g., guided by the "part-and-hole" bitmap. In certain embodiments, the encoding module 208 inserts into the "part-and-hole" segment map 407 (see FIG. 4) the segments of the cryptographic key that correspond to locations in the "part-and-hole" bitmap. A real cryptographic key segment is inserted for each user where the "part-and-hole" bitmap holds a bit value of one, and a fake key segment where the "part-and-hole" bitmap holds a bit value of zero. For example, with reference to FIGS. 3 and 4, looking at the first column of the "part-and-hole" bitmap 300, users 3281, 6519, and 6981 each have a one-bit value in the first column. Accordingly, the encoding module 208 may insert the first key segment 402, e.g., 7639, into the rows of the first column of the "part-and-hole" segment map 407 for these users, where the other users get one of the fake key segment 404a-w values in a proportion to keep the real cryptographic key segments 402 from standing out statistically.

Referring to FIG. 2, the encoding module 208, in one embodiment, generates a plurality of fake cryptographic keys as a function of a number of values in the "part-and-hole" bitmap that indicates that a user is assigned a key segment of the cryptographic key and a number of values in the "part-and-hole" bitmap that indicates that a user is not assigned a portion of the cryptographic key. As used herein, fake cryptographic keys are cryptographic keys that are generated, but used as decoys and not for encryption or decryption. For instance, to determine the number of fake cryptographic keys to generate, w, the encoding module 208 determines the number of zero-bit values in the "part-and-hole" bitmap and divides that number by the number of one-bit values in the map, rounding up to the nearest natural number as needed. In certain embodiments, this provides a balance to statistically hide the cryptographic key segments from hackers. Too few or too many fake cryptographic key segments, in various embodiments, would statistically highlight the cryptographic key segments as significant if analyzed.

The encoding module 208, in one embodiment, generates the determined number, w, of fake cryptographic keys. For instance, the encoding module 208 may use the key module 202 to generate cryptographic keys in the same manner that the segmented cryptographic key is generated. Alternatively, the encoding module 208 may generate a string of random values for each fake cryptographic key. The encoding module 208, in certain embodiments, segments each of the fake cryptographic keys into p segments. In different terms, to counter each segment of the cryptographic key Sn, w fake cryptographic keys are generated, 1 to w, with fake segment series Fmn, where m varies from 1 to w and n varies from 1 top.

The encoding module 208, in some embodiments, inserts into the "part-and-hole" segment map the fake key segments of the cryptographic key that correspond to locations in the "part-and-hole" bitmap that have a value indicating that a user is not assigned a key segment of the real cryptographic key, e.g., a value in the bitmap that comprises a zero-bit. In one embodiment, for every zero-bit field in the "part-and-hole" bitmap, the encoding module 208 selects a fake key segment to insert into the "part-and-hole" segment map as a function of the column number and the user's row number. For instance, the encoding module 208 may select a fake key segment, Fmn, where m=(row number) modulo (w+1) and n=the column number that is being filled in the segment map.

Figure 4:
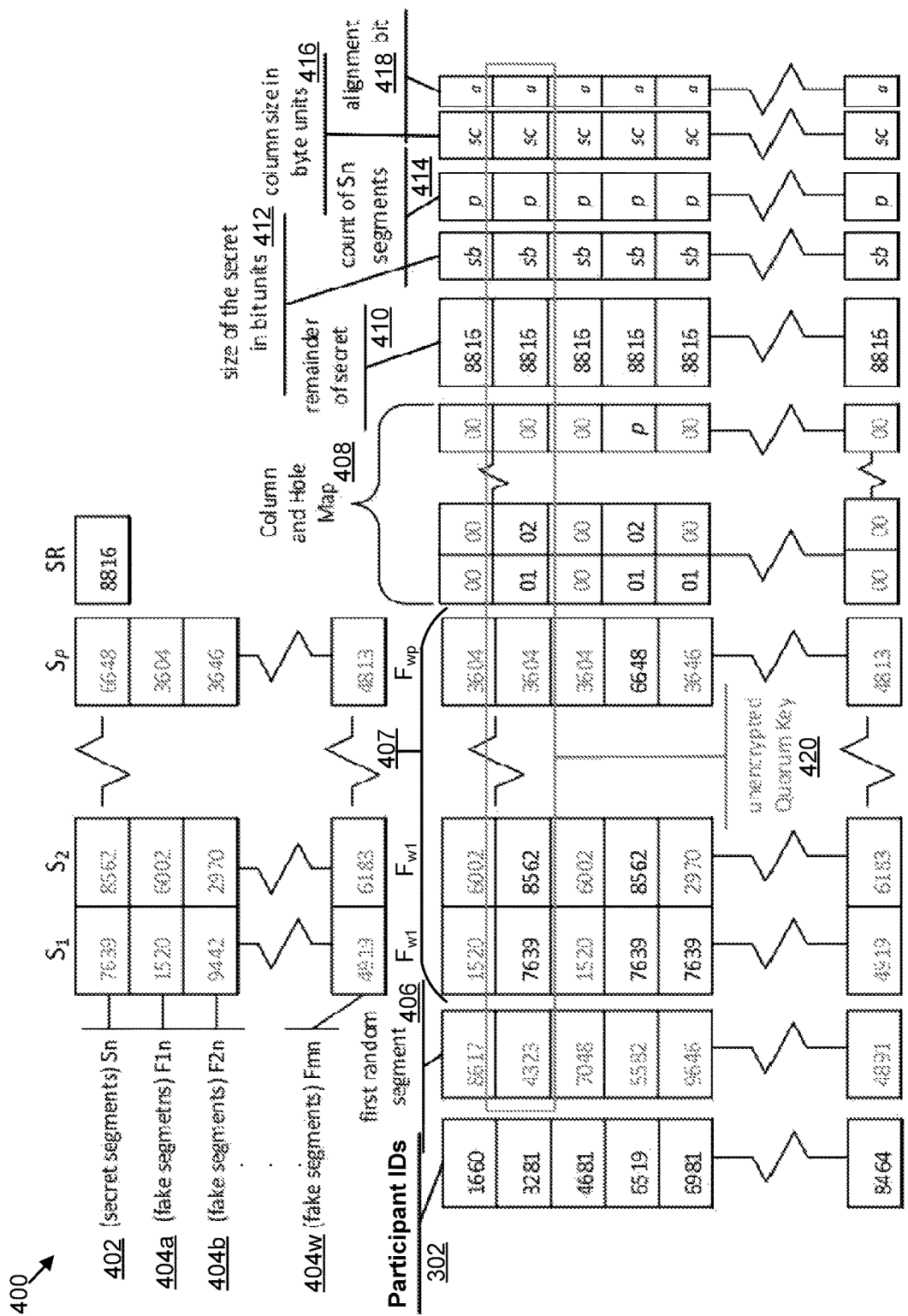
FIG. 4 is a schematic block diagram illustrating one embodiment of a map comprising a plurality of quorum keys used for cryptographic quorum key generation and distribution.

For example, with reference to FIGS. 3 and 4, looking at the first column of the "part-and-hole" bitmap 300, user 1660 does not have a one-bit value in the first column, indicating that the user has not been assigned a segment of the real cryptographic key 402. Therefore, the encoding module 208, based on the column number (1) and the row number (1) modulo (w+1), selects the first fake key segment of the first fake key 404a, which is 1520. The encoding module 208 may similarly fill-in the remainder of the zero-bit associated values in the "part-and-hole" segment map 407 for each of the users from the fake segments 404a-w.

Referring to FIG. 2, in a further embodiment, the encoding module 208 inserts a column of random values for each user before the first column of the "part-and-whole" segment map, which now contains the appropriately mapped cryptographic key and fake cryptographic key segments. The encoding module 208, for example, may generate a plurality of random value, rounded down or up to the nearest natural number. The size of each random number segment may be determined as a function of the size of the cryptographic key, sb, and the number of columns in the "part-and-hole" map, p, e.g., size=sb÷p. As shown in FIG. 4, the encoding module 208 inserts the column of random values 406 between the participant ID column 302 and the first column of the "part-and-hole" segment map 407 that has been filled-in with cryptographic key 402 and fake key segments 404a-w.

In one embodiment, the column of random values acts as cryptographic salt to encrypt and mislead or otherwise thwart an attempt by an attacker to misappropriate the cryptographic key.

Referring to FIG. 2, in one embodiment, the encoding module 208 determines the minimum number of bytes needed to represent the larger of the size of the cryptographic key in bits, sb, and the number of key segments, p. This value is known as the secret scalar, sc, and is calculated as ceiling(max($\log_2$ (sb), $\log_2$(p))+1)÷8).

The encoding module 208, in one embodiments, appends a "column-and-hole" map to the filled-in "part-and-hole" segment map where each value indicates the column number of the "part-and-hole" segment map that contains a segment of the cryptographic key. For example, referring to FIG. 4, the second, fourth, and fifth rows of the first column of the "column-and-hole" map 408 each comprise the column number '01' to indicate that the second, fourth, and fifth rows of the first column of the "part-and-hole" segment map 407 contain cryptographic key segments 402. Similarly, the second and fourth rows of the "column-and-hole" map 408 comprise the column number '02' to indicate that the second and fourth rows of the second column of the "part-and-hole" segment map 407 contain cryptographic key segments 402. The column numbers also correspond to the cryptographic key segment number or position within the cryptographic key, which is referenced when the cryptographic key is re-constructed. In certain embodiments, the size of each column of the "column-and-hole" map 408 is sc bytes per column. Where the "column-and-hole" map 408 is zero, it is expected that a fake cryptographic key segment will be stored in the "part-and-hole" segment map 407.

Referring to FIG. 2, in some embodiments, the encoding module 208 randomly swaps one or more columns of the "column-and-hole" map and their corresponding "part-and-hole" segment columns. Accordingly, the encoding module 208, in such an embodiment, randomly swaps one or more corresponding columns of the "part-and-hole" segment map, which is filled-in with real key segments and fake key segments, so that the columns within the "part-and-hole" segment map that correspond to the swapped columns of the "column-and-hole" map are also swapped to maintain the relationship between the swapped columns in each map. For example, if the encoding module 208 swaps columns two and five of the "column-and-hole" map, the encoding module 208 will also swap columns two and five of the filled-in "part-and-hole" segment map.

In some embodiments, the encoding module 208 swaps columns of the "column-and-hole" map, and the corresponding columns of the "part-and-hole" segment map within each user row instead of for all rows at the same time. For example, referring to FIG. 4, in such an embodiment, if the encoding module 208 swaps columns two and five for user 3281 in the "column-and-hole" map 408, the encoding module 208 will swap the corresponding columns for user 3281 in the "part-and-hole" segment map 407, but independently swaps the columns for each of the other users.

Referring to FIG. 2, the encoding module 208, in a further embodiment, appends a column to the "column-and-hole" map where each row contains the bits of the secret remainder, SR, if any remainder is left over from the division of the cryptographic key into p parts. The encoding module 208, in certain embodiments, appends a column of sc bytes to each row, which contains the binary size of the cryptographic key, sb. The encoding module 208, in some embodiments, appends a column of sc bytes where each row contains the count of the number of cryptographic key segments, p. In various embodiments, the encoding module 208 appends a column of one byte where each row contains the value of sc, or the count of bytes needed to represent the larger of sb or p. The encoding module 208 may then append a column where each row comprises a one bit with the value of 1 followed by the number of zero-valued bits needed to make the entire number of bits in the entire row, e.g., a row that includes all the above values for a particular user, as shown in FIG. 4, which is also known as the "cryptographic quorum key" 420, divisible by eight. In other words, the end of the cryptographic quorum key should be byte aligned.

In some embodiments, by preceding each cryptographic quorum key with a random segment and then appending the less random "column-and-hole" map, the secret remainder, and the specific byte sizings at the end the cryptographic key segments and the fixed details that are repeated within each cryptographic quorum key can be better hidden when the cryptographic quorum key is encrypted.

In one embodiment, the distribution module 210 is configured to distribute each of the plurality of encoded key segments, e.g., each cryptographic quorum key, to each associated user, e.g., each user identified by the user's unique ID. In some embodiments, the distribution module 210 stores each cryptographic quorum key on a secure device, such as a network isolated remote computer, a secure token, a hardware security module ("HSM"), or such like.

In one embodiment, the distribution module 210 requests a user to provide one or more credentials or other identifying information to authenticate the identity of the user. In one embodiment, for instance, the distribution module 210 requests a passphrase, password, passcode, or the like from the user. In certain embodiments, the passphrase is mandatory, and may be used to encrypt the cryptographic quorum key prior to distributing the cryptographic quorum key to the user. In another embodiment, the distribution module 210 sends an SMS or text message to the user that contains a verification code. The user may then be required to provide the verification code prior to receiving the cryptographic quorum key. These embodiments are referred to as "additional credentials."

In some embodiments, the distribution module 210 requests an email address from the user, which is used to send an email to the user that contains a link to verify the user's email address. Once the distribution module 210 has verified the email address, the user may be required to provide the email address prior to retrieving the cryptographic quorum key. Similarly, a verification code may be sent to the user's email address, which the user may need to provide prior to retrieving the cryptographic quorum key. In certain embodiments, the distribution module 210 requests one or more biometrics from the user, e.g., a fingerprint, a voice print, a retinal scan, and/or the like, to verify the user's identity before the user can retrieve the cryptographic quorum key. These embodiments are also referred to as "additional credentials".

After the distribution module 210 has verified the identity of the user, based on the passphrase and/or other authentication methods, the distribution module 210 bundles the cryptographic quorum key for a user with the user's non-passphrase credentials and encrypts the bundle using the passphrase. The distribution module 210 may then provide the encrypted cryptographic quorum key to a user via a smart card, a CD-ROM, a secure FTP server, a secured access shared storage device (e.g., NAS, SAN, etc.), a security token, a hardware security module ("HSM") and/or the like.

In some embodiments where the cryptographic key is an RSA private key, the distribution module 210 bundles the cryptographic quorum key with the "additional credentials" and signs the bundle using the cryptographic private key. The distribution module 210 then packages the signed quorum key into a PFX file or a PKCS #12 container, which are cryptographic standards, with the accompanying public key certificates and signing certificate chain, and encrypted with the passphrase according to the PKCS #12 standard. In this manner, the distribution module 210 provides a tamper seal for the "additional credentials" as well as a standard mechanism for distributing the public key certificate of the cryptographic key. In certain embodiments, if a user's cryptographic quorum key is expired, stolen, or otherwise compromised, the key module 202 may revoke the cryptographic key and reissue, or issue a new, cryptographic key with a new set of cryptographic quorum keys for each user.

Re-Constructing and Using the Cryptographic Key

In certain embodiments, if the cryptographic key comprises a private key of a public/private key pair, the cryptographic key is stored in a "vault" or a network isolated computer. The key is not intended to leave the vault, and therefore if the key is needed to digitally sign data, such as software deliverables, the data needs to be moved into the vault, signed with the cryptographic key, and then moved out of the vault and delivered publically.

However, the generation and use of cryptographic quorum keys, as described herein, allows software, for example, to be signed more conveniently within the software publisher's internal network, including VPN access, because the cryptographic key remains protected. As used herein, this refers to "quorum signing." Instead of relying on a single officer, in one embodiment, and from a network isolated environment, a plurality of product stakeholders can be enlisted to approve the publishing and signing of a software offering. This may be more flexible and convenient than traditional software signing procedures, and removes the single points of failure from the digital signing process.

By cohort design, using cryptographic quorum keys, one or more stakeholders can withhold their cryptographic quorum key to prevent a particular software release from being published. For example, the quorum characteristics can be such that if both the QA manager and the customer service manager withhold their cryptographic quorum keys, then the software may not be published because the cryptographic key cannot be re-constructed without their cryptographic quorum keys, e.g., without their segments of the cryptographic key contained in each of their cryptographic quorum keys. Similarly, if the minimum and/or mandatory requirements for a quorum or cohort are not met, or if any of the authentication measures described above are invalid or missing, then the software publisher's signature will be invalid and the software will not be trusted.

In such embodiments, because the software can be signed within the software publisher's internal network, signing can be conveniently incorporated into the publisher's regular production and distribution processes, minimizing handling errors, while maintaining strict protection of the publisher's private key.

Quorum signing, in one embodiment, may occur on a quorum signing server, such as a sever 108 described above with reference to FIG. 1. The quorum signing server may be setup within a software publisher's internal, secure, and firewalled network. In one embodiment, at least a portion of the re-construct module 212 is located on the quorum server. The re-construct module 212, in one embodiment, receives cryptographic quorum keys from various users/quorum members, along with the users' passcode and "additional credentials" for both decryption and validation. In general, the re-construct module 212, in a further embodiment, signs the software packages, or other data, with a reconstructed version of the software publisher's private key, e.g., the cryptographic key, checks the validity of the signature and the public key, and makes the signed software package available for distribution.

In one embodiment, the re-construct module 212 receives the users' cryptographic quorum keys via a web interface where the users can upload their keys (e.g., a PFX file or a PKCS #12 container) and provide their passcode and "additional credentials." In response to receiving at least one quorum key, the re-construct module 212 begins a quorum session. The re-construct module 212 may alert other users that a quorum session has begun, and prompt them for their quorum keys. In one embodiment, the re-construct module 212 starts a timer in response to initiating a quorum session. The timer provides a time period for completing re-construction of the cryptographic key and the signing of the software/data, which requires receiving cryptographic quorum keys from a plurality of different users. If the cryptographic key is not re-constructed during the time period, the quorum session ends, to enhance security, requiring re-authentication of each participant by starting a new quorum signing session.

When the re-construct module 212 receives a cryptographic quorum key, e.g., a PFX file or a PKCS #12 container, from a user, the re-construct module 212 also requests the user's password, passphrase, or the like, and unpacks any "additional credentials" to validate, such as collecting from the user a randomly generated verification code sent to the user via SMS/text message/email, collecting biometric information, and/or the like.

If a user's authentication and "additional credentials" are verified, the re-construct module 212 verifies the digital signature of the PFX file or a PKCS #12 container, together with a check that each public key certificate in the certificate signing chain is trusted and has not been revoked. In this manner, the re-construct module 212 verifies that the cryptographic quorum key has not been tampered with and/or that the user is still a valid user. The re-construct module 212 may then take the user's passphrase and decrypt the cryptographic quorum key, e.g., get the cryptographic quorum key out of the PFX file or a PKCS #12 container.

Now that the re-construct module 212 has the cryptographic quorum key, e.g., an encoded row of data described and illustrated in FIG. 4 for a particular user, the re-construct module 212 may start with the least significant end of the decrypted cryptographic quorum key—the end that has the byte alignment bits—and read backwards searching for the byte alignment bit. Once the byte alignment bit is found, the re-construct module 212 then reads the column size byte, e.g., the value for sc, backwards eight bits from the byte alignment bit.

After the re-construct module 212 reads the column size byte, the re-construct module 212 may read backwards sc bytes to get the number of segments of the cryptographic key, p, and another sc bytes backwards to get the size of the cryptographic key in bits, sb. Given p and sb, the size of the secret remainder, SR, can be determined by sb modulo p, and read backwards from the last read position. Note that SR will be NULL or empty if sb is evenly divisible by p.

The re-construct module 212, in one embodiment, checks that the value of SR for each of the users that are participating the quorum session is the same, or is in agreement. If sb is evenly divisible by p, there will be no remainder and therefore no value for SR, and all users that have an SR with no value will be in agreement. If the re-construct module 212 determines that at least one user has an SR value that is different from or disagrees with the SR value for two or more other users whose SR values are in agreement, then the re-construct module 212 may terminate the disagreeing user's quorum session. The remaining users whose SR values are in agreement may continue with the quorum session until time-out or completion.

If the re-construct module 212 determines that there is insufficient agreement to identify a user whose quorum session should be terminated, but that there is disagreement in the SR values, the re-construct module 212 alerts all the users that there is a passphrase issue and that the quorum signing session will not continue until the passphrase issue is remedied. At this point, another user may join the quorum session to break the disagreement stalemate and continue with users whose SR values are in agreement before the quorum session times out. Otherwise, if the disagreement persists until the quorum session times out, then the quorum session is terminated for all participants and can be reinitiated if the users intend to successfully complete their objectives.

After the re-construct module 212 reads the SR values, and the participating users are in agreement, then the "column-and-hole" map for the participating users can be constructed by reading sc bytes from the last read position backwards for each of the p columns to be constructed. At this point, the re-construct module 212 reads p key segments from the last column of the "part-and-hole" segment map backwards. For each key segment, the re-construct module 212 checks the "column-and-hole" map to determine whether the key segment is a real cryptographic key segment or a fake key segment. If the column in the "column-and-hole" map has the value of zero, then the key segment is fake and should be disregarded; otherwise, the number value in the "column-and-hole" map specifies which segment, Sn, e.g., which position, in the cryptographic key the segment belongs. For instance, if the value in the column is '02', then the corresponding key segment is a real cryptographic key segment and is the second segment of the cryptographic key. The re-construct module 212 iterates through each user until the cryptographic key is completely re-constructed.

In one embodiment, if the re-construct module 212 determines that two participating users provide key segments for the same position within the cryptographic key, the re-construct module 212 checks whether the segment values are the same. If so, then one of the values is used for re-constructing the cryptographic key. Otherwise, if the two segments for the same position are different, then the re-construct module 212 alerts the other users that there is a discrepancy, and terminates the quorum signing session due to the evidence of tampering.

In one embodiment, when the re-construct module 212 receives enough segments, Sn, from authenticated users to re-construct the cryptographic key, the signing module 214 may continue with digitally signing the software or other data. Otherwise, the re-construct module 212 may continue to wait for the sufficient mix and number of users until the time-out period has expired. Upon reaching the time-out period, the re-construct module 212 terminates the quorum session, and the software or other data will not be digitally signed.

In one embodiment, the signing module 214 digitally signs the software, or other data, that requires a digital signature using the re-constructed cryptographic key. In certain embodiments, the signing module 214 repackages the re-constructed cryptographic key from volatile memory, where it may be stored during re-construction, into a password protected PFX file or PKCS #12 container. In certain embodiments, the signing module 214 generates a random password and encrypts the re-constructed cryptographic key using the password before it is written to a PFX file or a PKCS #12 container. In certain embodiments, the signing module 214 stores the PFX file or PKCS #12 container in a memory mapped file instead on a physical disk that is accessible to other processes, e.g., a local disk or network disk storage.

In one embodiment, the signing module 214 provides the PFX file or PKCS #12 container to a signing tool for digitally signing the software or other data. In such an embodiment, the signing module 214 may check a process ID of the signing tool to determine whether the signing tool is authorized to access the cryptographic key, which may also prevent unauthorized programs from accessing the cryptographic key.

In certain embodiments, the signing module 214 directs the signing tool to the software deliverables or other data that should be signed with the cryptographic key. The signing tool may then digitally sign the software deliverables, or other data, and the signing module 214 may deliver the signed software clients outside of the publisher's internal data network, for example. After the software is digitally signed with the cryptographic key, the signing module 214 verifies the signature with the publisher's public key. The signing module 214 may also verify that the public key has not been revoked and that the certificate chain of the public key certificate contains at least one trusted root certificate. If the signing module 214 determines that any of the verifications fail, then the signing module 214 may delete the software deliverable, may send a failure message to each quorum participant, and/or terminate the quorum session.

In one embodiment, when the signing module 214 has completed signing the software or other data, or the quorum session is terminated due to authentication failures or timeouts, the signing module 214 deletes the PFX file and/or the PKCS #12 container by first writing over the contents of the file stored on disk, block per block, with random values, and then deleting the file. Furthermore, after the cryptographic key is no longer needed, the signing module 214 may write over the area of volatile memory where the cryptographic key is stored with random values before releasing the memory area back to the computer's free memory pool. Similarly, the signing module 214 may write over all of the areas of volatile memory where the quorum keys are stored with random values prior to freeing the memory back to the computer's free memory pool.

In one embodiment, if the software or other data was successfully signed, the signing module 214 sends a notification to each participating user indicating that the software was successfully signed and that the quorum session should be or will be terminated. Furthermore, the signing module 214 may move or copy the signed software to staging storage for further testing and distribution.

FIG. 3 depicts one embodiment of a portion of a "part-and-hole" bitmap 300 used for cryptographic quorum key generation and distribution. In one embodiment, the map 300 includes a sorted column 302 of IDs for users who are designated to participate in groups or cohorts. For each group of members 304a-304n, the map module 206 completes each group's portion of the "part-and-hole" bitmap 300 by iterating between each of the natural numbers ($\mathbb{N}$) between zero and $2^{Ni}$. The map module 206 adds a column to the "part-and-hole" bitmap 300 for every number between zero and $2^{Ni}$, that when converted to its binary equivalent, has the number of one-bits that is equal to the number of users for the group, Ni, minus the minimum number of users required to reconstruct the protected cryptographic key, Qi, plus one. This number is represented as Cspi. When a column is added, the participating users, in order, each receive the bit value of the natural number being considered, whether a one-bit or a zero-bit. Non-participating users are skipped over and receive a zero-bit, shown visually muted in FIG. 3. Columns are added in this manner for each group or cohort.

For instance, the first column after the column of IDs 302 is the first column of the "part-and-hole" bitmap 300 for Cohort $C_1$ 304a. The users with IDs 3281, 6519, 6981, and 8464 have each been assigned a matching one-bit or zero-bit from the in order bits of the first candidate natural number that had the same number of one-bits as the Cspi number for the group or cohort, e.g., a participant part 310 or a participant hole 308. Of note is the non-participants of Cohort $C_1$ 304a—the users with IDs 1660 and 4681—which are assigned zero-bits by default because the users are not members of Cohort $C_1$ 304a, e.g., non-participant holes 306.

However, the users with IDs 1660, 4681, and 6519 are members of Cohort $C_k$ 304n, and may be assigned a one-bit or a zero-bit in successive columns based on the binary representations of the natural numbers from zero to $2^{Nk}$ that have the same number of one-bits as Cspk, or the Cspi for the last or $k^{th}$ cohort. Also note that the user ID 6519 is a participant of both Cohort $C_1$ 304a and Cohort $C_k$ 304n. Accordingly, the map module 206 may iterate over the natural numbers ($\mathbb{N}$) from zero to $2^{Ni}$ for each cohort/group and append columns with one-bits, and zero-bits to complete the "part-and-hole" bitmap 300. The "part-and-hole" bitmap 300, in one embodiment, ensures that with an insufficient number of users, from any single group, the cryptographic key cannot be reconstructed.

FIG. 4 depicts an example embodiment of a map 400 comprising a plurality of cryptographic quorum keys 420 used to protect and distribute a generated cryptographic key. In one embodiment, the map 400 comprises a sorted column 302 of IDs for users who are participating in a quorum session. Furthermore, the map 400 includes a column of random values 406 that is used as cryptographic salt to thwart any attackers, as described above. The map 400 also includes a "part-and-hole" segment map 407 that has been filled with real key segments 402 and fake key segments 404a-w, based on whether a value in the "part-and-hole" bitmap from 300 comprised a one-bit value, which is assigned a real key segment 402, or a zero-bit value, which is assigned a fake key segment 404a-w.

A "column-and-hole" map 408 is appended to the "part-and-hole" segment map 407 which indicates which values in the completed "part-and-hole" segment map 407 contain real key segments 402, and which values contain fake key segments 404a-w. Various columns may then be appended to the "column-and-hole" map 408 such as a column comprising the remainder of the cryptographic key 410, a column comprising the size of the cryptographic key in bits 412, a column comprising the count of cryptographic key segments 414, a column comprising the size of each cryptographic segment in bytes 416, and one or more byte-alignment bits 418. The encoding module 208, for each user, concatenates each row of the map 400 to generate a quorum key 420 for the user, as explained in more detail above.

Figure 5:
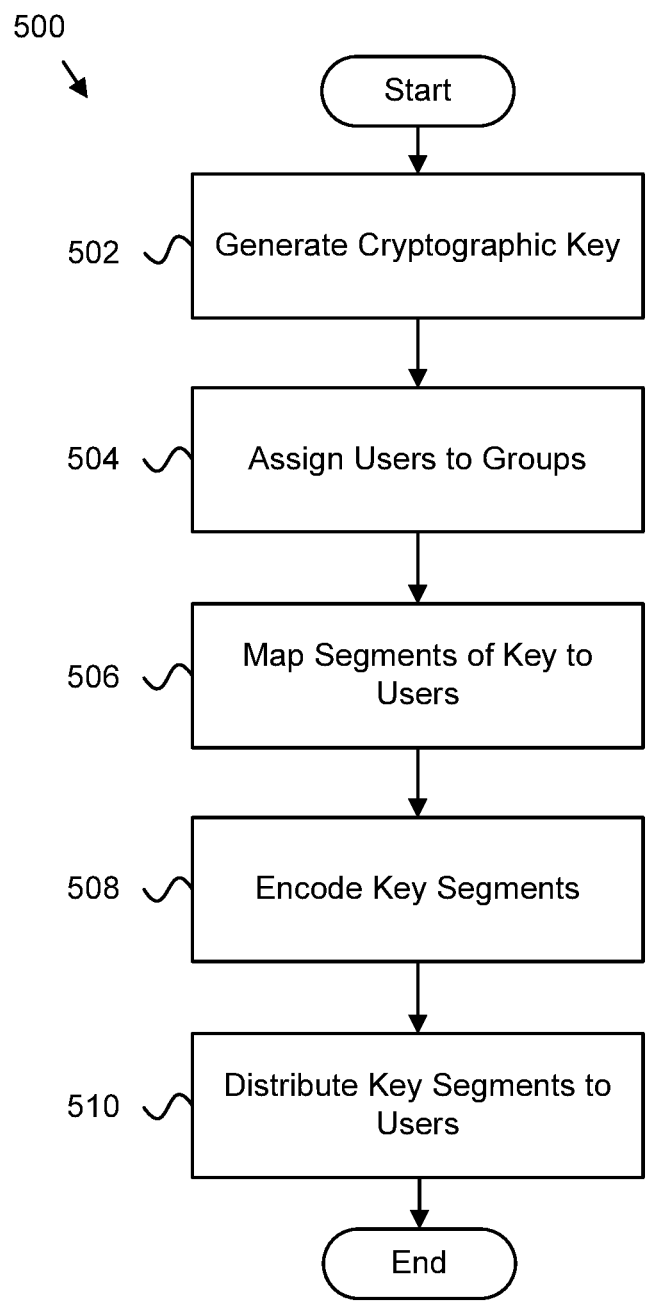
FIG. 5 is a schematic flow-chart diagram illustrating one embodiment of a method for cryptographic quorum key generation and distribution.

FIG. 5 depicts one embodiment of a method 500 for cryptographic key generation and distribution. In one embodiment, the method 500 begins, and a key module 202 generates 502 a cryptographic key. The key module 202 may divide the cryptographic key into a plurality of segments such that the cryptographic key may be later re-constructed by combining each of the plurality of key segments.

In a further embodiment, the group module 204 assigns 504 each user of a plurality of users to one or more groups of users such that a total number of users that are assigned to each group is not larger than the number of bits in the cryptographic key. In some embodiments, the map module 206 maps 506 each of the plurality of key segments of the cryptographic key to one or more of the plurality of users as a function of a number of users within each group such that a designated minimum, but ad-hoc, number of members of each group can later participate in order to fully reconstruct the cryptographic key.

In one embodiment, the encoding module 208 encodes 508 each of the plurality of key segments in a predefined format based on the mapping. In certain embodiments, the distribution module 210 distributes 510 each of the plurality of encoded key segments to each of the one or more users that is mapped to each encoded key segment, and the method 500 ends. In one embodiment, each encoded key segment is bundled with "additional credentials" for later user validation, and encrypted with per-user passcodes prior to being distributed 510 to each respective user individually.

Figure 6:
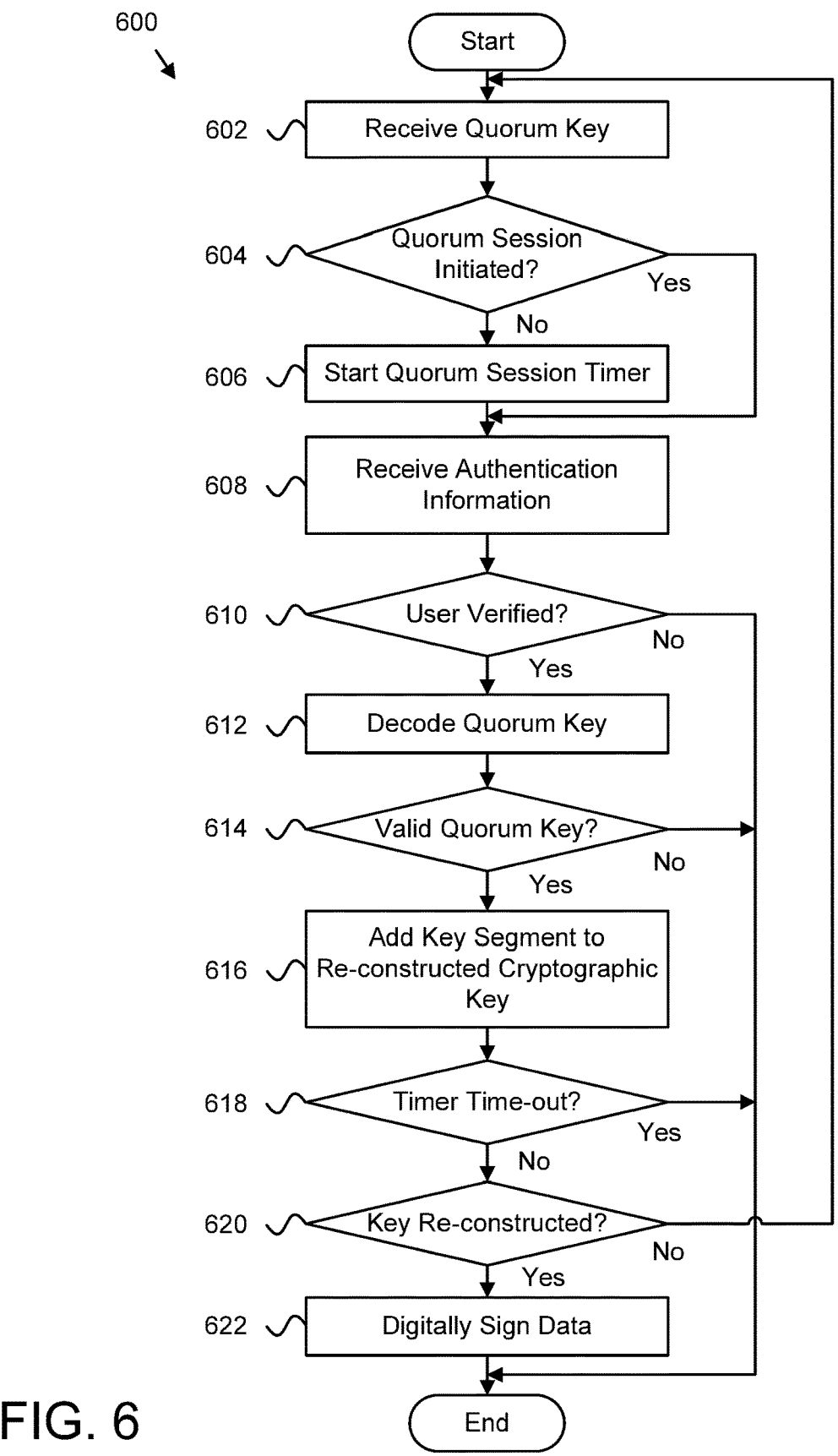
FIG. 6 is a schematic flow-chart diagram illustrating one embodiment of another method for cryptographic quorum key collection, reconstruction, validation, and usage.

FIG. 6 depicts one embodiment of a method 600 for the re-construction of the generated cryptographic key post distribution. In one embodiment, the method 600 begins, and the re-construct module 212 receives 602 a cryptographic quorum key from a user. The re-construct module 212, in certain embodiments, determines 604 whether a quorum session has already been initiated. If not, in a further embodiment, the re-construct module 212 starts 606 a quorum session timer, which sets the time period for completing the quorum session, e.g., the time period for receiving each of the quorum keys from the users and re-constructing the cryptographic key. Otherwise, the quorum key user joins a session already in progress.

After the re-construct module 212 determines 604 that the quorum session is started, the re-construct module 212 receives 608 authentication information from the user, which may include a passphrase, a password, biometric information, a verification code previously sent to the user, and/or the like. In a further embodiment, the re-construct module 212 determines 610 whether the authentication information verifies the identity of the user. If not, in one embodiment, the method 600 ends.

Otherwise, if the user's identity is verified, which may include the validation of "additional credentials", the re-construct module 212 decodes 612 the cryptographic quorum key, and determines 614 whether the cryptographic quorum key is valid. For instance, the re-construct module 212 may check that certain data fields in the cryptographic quorum key, such as the remainder SR field, matches a corresponding data field of a cryptographic quorum key for a different user. If the re-construct module 212 determines that the cryptographic quorum key is not valid, the method 600 ends.

Otherwise, if the re-construct module 212 determines 614 that the cryptographic quorum key is valid, the re-construct module 212 adds 616 the cryptographic key segments provided in the cryptographic quorum key, generally a subset, to the re-constructed cryptographic key. In some embodiments, the re-construct module 212 determines 618 if the quorum session timer has timed-out. If so, then the method 600 ends. Otherwise, the re-construct module 212 further determines 620 whether the cryptographic key has been fully re-constructed. If so, then the signing module 214 digitally signs data, such as software deliverables, using the cryptographic key, and the method 600 ends. Otherwise, the re-construct module 212 receives 602 another cryptographic quorum key, and the method 600 begins again.

For convenience, Table 1 below provides a summary of the mathematical terms used herein:

TABLE 1

| | | |
|---|---|---|
| Cspi | Internal number, needed to build the 'part and hole map', specifying the number of Cohort participants required to share any one part. This number varies per cohort, Ci, and is one more than the number of participants in a cohort, Ni, minus the minimum number of cohort participants needed to for a valid Quorum Signature, Qi. | $\forall\, i \in \square: 0 < i <= K$<br>$Cspi = Ni - Qi + 1$ |
| Ci | A cohort is a subset of participants that have each their own participation characteristics (see Qi below). Individual participants can be members of zero or more cohorts as membership within a cohort is not exclusive between cohorts. | $\forall\, i \in \square: 0 < i <= K$<br>$Ci \subseteq \{\text{all participants}\}$ |
| Fmn | Internally, as a counter to the secret segments, Sn, a fake secret is maintained with fake segments, Fn. | $\forall\, m \in \square: 0 < m <= w$<br>fake secret $m = \sum_{n=1}^{P} Fmn$ |
| K | The number of defined cohorts. | $K \in \square: K >= 1$ |
| N | The total number, including duplicates, of members participating in the various cohorts. N is limited by the binary size of the secret being protected. | Key's Binary Size $> N > 0$, and $N = \sum_{i=1}^{K} Ni > 0$ |

TABLE 1-continued

| | | |
|---|---|---|
| Ni | The number of members within any specific cohort, Ci. | $\forall\ i \in \square: K >= i > 0$<br>$Ni = |Ci| >= 1$ |
| MAX RSA KeySize | The maximum RSA key size changes over time, and so is shown to have an 'unknown' upper bound as used herein. The MAX RSAKeySize sets the upper bounds as used herein when protecting RSA keys, which limits the size of the quorum that can be supported. | $? > MAX\ RSAKeySize >= 1024$ |
| P | After construction of the 'part and hole' bitmap, the number 'p' can be counted as the number of columns in the map. | $sb >= p > 0$ |
| Qi | The number of members of a cohort that need to participate for the cohort's portion of a quorum signature to be valid. | $\forall\ i \in \square: K >= i > 0$<br>$Ni >= Qi > 0$ |
| sb | Binary size of the entire secret. | |
| sc | Minimum number of bytes needed to represent the segment size, sb, as an integer or the segment count, p, as an integer. | $ceiling((max(log2(sb), log2(p)) + 1) \div 8)$ |
| Sn | Internally, the key is divided into a series of p secret segments, Sn. | $secret = [\frown^{P}_{n=1} Sn] \frown SR$ |
| SR | After the binary secret is divided into p parts, the remainder bits of the secret, SR, is needed to complete the subsequent reconstruction. | $secret = [\frown^{P}_{n=1} Sn] \frown SR$ |
| sr | Size of secret remainder, SR, in bits | $sb - p(floor(sb \div p))$ where $sb >= p$ |
| ss | Size of each segment, Sn, and fake segment, Fmn. | $floor(sb \div p)$ where $sb >= p$ |
| w | Represents the proportional number of fake secrets to hide the secret. | w = ceiling (number of holes in 'Part and Hole Map' ÷ number of fills in the 'Part and Hole Map') |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
generating a secret, the secret divided into a plurality of secret segments, wherein the secret is re-constructed by combining each of the plurality of secret segments;
assigning each user of a plurality of users to one or more groups of users, wherein a total number of users assigned to each group is not larger than a number of bits in the secret;
mapping each of the plurality of secret segments of the secret to one or more of the plurality of users as a function of a number of users within each group by:
determining, for each group, a total number of users within the group;
calculating, for each group, a number of users of the group that are required for providing a secret segment of the secret that is associated with the users within the group; and
generating a map comprising a plurality of rows and columns, each row corresponding to a user and each column corresponding to a secret segment of the secret, wherein an intersection of a row and column comprises a value that indicates whether the user is assigned the corresponding secret segment of the secret, the number of secret segments generated as a function of the number of columns in the map, wherein a bit length of the secret is divided by the number of columns in the map to determine the number of secret segments;
encoding each of the plurality of secret segments in a predefined format based on the mapping; and
distributing each of the plurality of encoded secret segments to each of the one or more users that is mapped to each encoded secret segment.

2. The method of claim 1, further comprising re-constructing the secret by receiving encoded secret segments from at least a subset of the plurality of users, the at least a subset of the plurality of users comprising different secret segments of the secret.

3. The method of claim 2, further comprising decoding the encoded secret segments for each user of the subset of the plurality of users to determine the secret segment and a position of the secret segment in the secret.

4. The method of claim 2, wherein at least one user of a group of users is designated as being required for re-constructing the secret such that the encoded secret segment of the at least one user is necessary for re-constructing the secret.

5. The method of claim 2, further comprising determining a number of users of each group of users that are required to provide an encoded secret segment for re-constructing the secret.

6. The method of claim 1, further comprising randomly swapping one or more columns of the map after the map is completed for each user and each secret segment of the secret.

7. The method of claim 1, further comprising:
determining a number of fake secrets to generate as a function of a number of values in the map that indicates that a user is assigned a secret segment of the secret and a number of values in the map that indicates that a user is not assigned a portion of the secret;
generating the determined number of fake secrets; and
dividing each of the generated fake secrets into a plurality of secret segments.

8. The method of claim 7, further comprising:
inserting into the map each of the plurality of secret segments at a corresponding location in the map that comprises a value indicating that a user is assigned a secret segment of the secret; and
inserting into the map each of the plurality of fake secret segments at a corresponding location in the map that comprises a value indicating that a user is not assigned a secret segment of the secret.

9. The method of claim 8, further comprising inserting a column at the beginning of the map that includes a unique random value for each row in the map, the unique random value having a size determined as a function of the size of the secret and the number of columns in the map.

10. The method of claim 8, further comprising appending a secret segment identification map to the map of cryptographic and fake secret segments, wherein each intersection of rows and columns of the secret segment identification map comprises a value that indicates whether an intersection of a column and row in the map of cryptographic and fake secret segments comprises a secret segment or a fake secret segment.

11. The method of claim 10, further comprising randomly swapping one or more columns within the map of cryptographic and fake secret segments and randomly swapping one or more corresponding columns within the secret segment identification map.

12. The method of claim 10, further comprising appending to the secret segment identification map:
a column where each row comprises a set of bits representing a remainder of the secret;
a column where each row comprises the number of bits in the secret;
a column where each row comprises the number of secret segments of the secret; and
a column where each row comprises a number of bytes representing a larger one of the number of bits in the secret and the number of secret segments of the secret.

13. The method of claim 12, wherein encoding each of the plurality of secret segments comprises combining, for each user, the unique random value, a row of the cryptographic and fake secret segments, a row of the secret segment identification map, the remainder of the secret, the number of bits in the secret, the number of secret segments of the secret, the number of bytes representing the larger one of the number of bits in the secret and the number of secret segments of the secret, and one or more bits for byte aligning the encoded secret segment.

14. The method of claim 1, further comprising distributing each of the plurality of encoded secret segments to each of the one or more users in response to receiving credentials from each user that verify an identity of the user.

15. An apparatus comprising:
a key module that generates a secret, the secret divided into a plurality of secret segments, wherein the secret is re-constructed by combining each of the plurality of secret segments;
a group module that assigns each user of a plurality of users to one or more groups of users, wherein a total number of users assigned to each group is not larger than a number of bits in the secret;
a map module that maps each of the plurality of secret segments of the secret to one or more of the plurality of users as a function of a number of users within each group by:
determining, for each group, a total number of users within the group;
calculating, for each group, a number of users of the group that are required for providing a secret segment of the secret that is associated with the users within the group; and
generating a map comprising a plurality of rows and columns, each row corresponding to a user and each column corresponding to a secret segment of the secret, wherein an intersection of a row and column comprises a value that indicates whether the user is assigned the corresponding secret segment of the secret, the number of secret segments generated as a function of the number of columns in the map, wherein a bit length of the secret is divided by the number of columns in the map to determine the number of secret segments;
an encoding module that encodes each of the plurality of secret segments in a predefined format based on the mapping; and
a distribution module that distributes each of the plurality of encoded secret segments to each of the one or more users that is mapped to each encoded secret segment.

16. The apparatus of claim 15, further comprising a re-construction module that re-constructs the secret by receiving encoded secret segments from at least a subset of the plurality of users, the at least a subset of the plurality of users comprising different secret segments of the secret.

17. The apparatus of claim 16, wherein the re-construction module further determines a number of users of each group of users that are required to provide an encoded secret segment for re-constructing the secret.

18. A computer program product comprising a computer readable storage medium having program code embodied therein, the program code readable/executable by a processor for:
generating a secret, the secret divided into a plurality of secret segments, wherein the secret is re-constructed by combining each of the plurality of secret segments;
assigning each user of a plurality of users to one or more groups of users, wherein a total number of users assigned to each group is not larger than a number of bits in the secret;
mapping each of the plurality of secret segments of the secret to one or more of the plurality of users as a function of a number of users within each group by:
determining, for each group, a total number of users within the group;
calculating, for each group, a number of users of the group that are required for providing a secret segment of the secret that is associated with the users within the group; and
generating a map comprising a plurality of rows and columns, each row corresponding to a user and each column corresponding to a secret segment of the secret, wherein an intersection of a row and column comprises a value that indicates whether the user is assigned the corresponding secret segment of the secret, the number of secret segments generated as a function of the number of columns in the map, wherein a bit length of the secret is divided by the number of columns in the map to determine the number of secret segments;

encoding each of the plurality of secret segments in a predefined format based on the mapping; and distributing each of the plurality of encoded secret segments to each of the one or more users that is mapped to each encoded secret segment.

* * * * *